(12) United States Patent
Kugai

(10) Patent No.: US 6,275,609 B1
(45) Date of Patent: Aug. 14, 2001

(54) IMAGE PROCESSING APPARATUS AND METHOD

(75) Inventor: Masami Kugai, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/228,410

(22) Filed: Jan. 12, 1999

(30) Foreign Application Priority Data

Jan. 16, 1998 (JP) .................................................. 10-006861

(51) Int. Cl.$^7$ .......................................................... G06K 9/34
(52) U.S. Cl. ............................................................ 382/175
(58) Field of Search ..................................... 382/175, 176, 382/177, 178, 179, 180, 173; 358/462, 464

(56) References Cited

U.S. PATENT DOCUMENTS

| | | | |
|---|---|---|---|
| 5,105,468 | * 4/1992 | Guyon et al. | 382/14 |
| 5,491,758 | * 2/1996 | Bellegarda et al. | 382/187 |
| 5,680,479 | * 10/1997 | Wang et al. | 382/176 |
| 5,926,567 | * 7/1999 | Collins | 382/187 |

FOREIGN PATENT DOCUMENTS 6-68301   6/1994  (JP) .

* cited by examiner

*Primary Examiner*—Andrew W. Johns
*Assistant Examiner*—Seyed. Azarian
(74) *Attorney, Agent, or Firm*—Fitzpatrick, Cella, Harper, & Scinto

(57) ABSTRACT

Image data representing a text-containing original image read by a scanner or the like is subjected to area partitioning processing and character recognition processing so as to be converted to icons and displayed (S11–S15). The icons include icons representing text and bitmap images, etc. When any icon is designated by a mouse (S17), image data that has undergone the area partitioning processing and character recognition processing and that corresponds to this icon is displayed (S21–S22).

26 Claims, 10 Drawing Sheets

FIG. 8

| ADL : DATA LENGTH |
|---|
| TYPE : DATA TYPE |
| ADD : DATA |
| |

IMAGE PROCESSING APPARATUS AND METHOD

BACKGROUND OF THE INVENTION

This invention relates to an image processing apparatus and method for performing image processing such as character recognition based upon an input image.

There is increasing use of software that makes it possible to perform optical character recognition (OCR) by personal computer so that image data inclusive of document image data entered by an image reading device such as an image scanner or facsimile machine can be recognized. An example of such OCR software known in the art is OmniPage Pro 6.0J, which Caere Corporation made available for sale in November of 1996. This is OCR software for Windows 3.1 or Windows 95 and supports documents in both the English and Japanese languages.

By running this OCR software on a personal computer to apply character recognition processing to image data that includes document image data, text included in the image data can be converted to character codes. That is, the entirety of the original image data inclusive of text is split into areas such as a text area, image area, table area and line-drawing area. By applying character recognition processing to the image data within the text and table areas, textual portions contained in the image data can be converted to character code data. The other areas can be left in the form of bitmap image data. Then, as by using the Rich Text Format, a file holding the layout of the text and image areas and the format information is generated.

More specifically, original image data containing text captured by the image reading device is displayed on the monitor of a personal computer. At such time the left half, for example, of the display screen is used to display the image that has been read.

Next, the personal computer performs processing to partition the image into prescribed areas and causes the monitor to display a document image in which each area (block) is enclosed by a border.

Next, the personal computer subjects textual areas and table areas to character recognition and causes text data, which results from this character recognition, to be displayed on the other half of the monitor screen, e.g., the right half. The text being displayed in the window that displays the text data generally is capable of being edited. This editing is different from ordinary editing. That is, when a character being displayed in the text window is clicked on using a mouse, the corresponding character image and character candidates from second-ranked candidates onward resulting from character recognition are displayed. By selecting a character candidate, the user can change the character currently being displayed, namely the first-ranked candidate, to the selected character. This function is an editor (referred to as an OCR editor) that makes possible revisions specific to OCR.

After character recognition processing is completed, the text can be preserved in a Rich Text Format (RTF) file. At such time, image areas other than text areas can also be preserved in the RTF file. These areas are preserved in a data structure representing a layout almost the same as the layout of the original image containing the text. If an RTF file having this data structure is read into document processing software such as Microsoft Word, for example, a document file in which textual portions have been converted to character codes can be edited on a screen displayed in a layout almost the same as that of the original image.

With the OCR software described above, however, the original image is displayed on the display screen only one page at a time. The image of the page desired to be edited is displayed on the left half of the screen, and the text window is displayed on the right half of the screen. As a consequence, the user edits the text while observing a display in which one page of an image of interest is displayed on both the left and right sides of the screen.

This editing operation is not troublesome if the document image that has been read in consists of one page. However, in a case where a plurality of pages are to be subjected to OCR processing, particularly a case where editing is performed while making cross reference to a plurality of pages, the fact that these pages cannot be observed on the screen simultaneously places an excessive burden upon the user and results considerable inconvenience. Problems also arise in terms of the ease with which pages can be moved and copied on a per-page basis.

SUMMARY OF THE INVENTION

Accordingly, an object of the present invention is to provide an image processing apparatus and method featuring easier manipulation and editing of input images.

According to the present invention, the foregoing object is attained by providing an image processing apparatus comprising: area partitioning means for splitting an input image into a plurality of block areas and generating a data block with regard to each block image, the data block having a prescribed structure inclusive of attribute data conforming to the type of block image; and symbol display means for assigning, to each of the plurality of block images in dependence upon the attribute data, any symbol from among a plurality of predetermined symbols, and displaying the assigned symbols in at-a-glance form.

The apparatus preferably further comprises reproducing means which, when any symbol among the symbols displayed by the symbol display means has been selected, is for reproducing the block image that corresponds to the selected symbol based upon data contained in the data block that corresponds to this block image.

The symbol display means preferably displays, in at-a-glance form, an input-image symbol that contains the symbols assigned to respective ones of the plurality of block images and that represents overall composition of the input image.

The symbol display means preferably displays the input-image symbol for each individual page of the input image.

The symbol display means preferably lays out the symbols, which have been assigned to respective ones of the plurality of block images, in the input-image symbol in conformity with placement of the plurality of block images in the input image.

Further, according to the present invention, the foregoing object is attained by providing an image processing method comprising: an area partitioning step of splitting an input image into a plurality of block areas and generating a data block with regard to each block image, the data block having a prescribed structure inclusive of attribute data conforming to the type of block image; and a symbol display step of assigning, to each of the plurality of block images in dependence upon the attribute data, any symbol from among a plurality of predetermined symbols, and displaying the assigned symbols in at-a-glance form.

Note, that the symbol are assigned from among the plurality of predetermined symbols in the above apparatus and method. However, the symbol may be created by performing prescribed image processing. For example, the symbol may be created by performing image-reduction for each of the plurality of block images. More particularly, following methods can be applied. That is, a reduced image may be created by selecting every 5 lines, to length and width directions of the block image, among the block image or using a prescribed image-reduction function provided with an operation system like Windows. Preferably, when the image-reduction processing are performed, a user may select desired rate.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing the structure of actual data according to this embodiment of the present invention;

DESCRIPTION OF THE PREFERRED EMBODIMENT

An embodiment in which the image processing apparatus according to the present invention is applied to a personal computer will now be described in detail with reference to the drawings.

Figure 1:
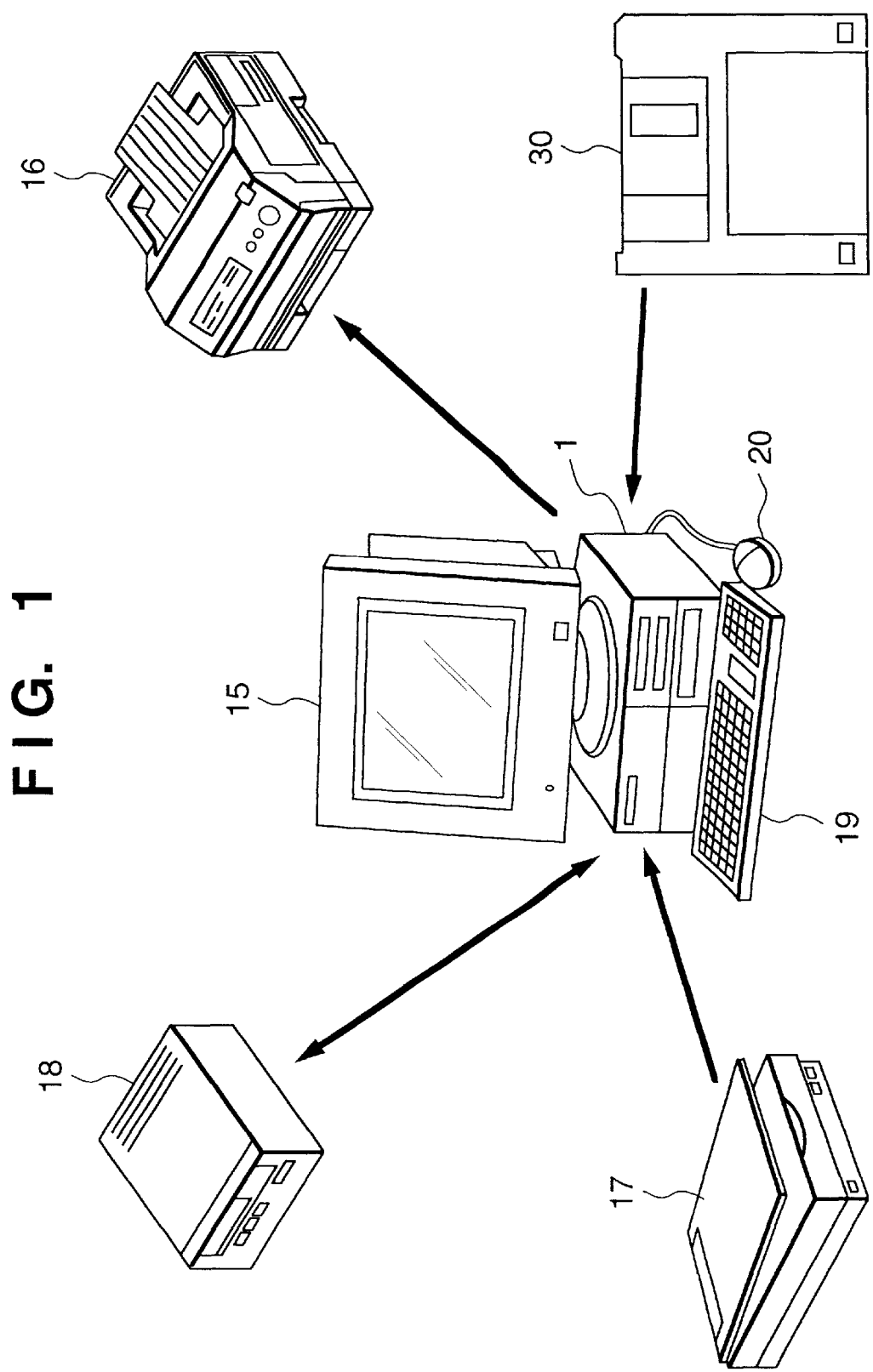
FIG. 1 is a diagram showing an example of the configuration of a character recognition system according to an embodiment of the present invention.

FIG. 1 is a diagram showing an example of the configuration of a character recognition system according to an embodiment of the present invention.

The character recognition system shown in FIG. 1 includes a personal computer 1 to which are connected an image scanner 17 for scanning an original image (document) inclusive of text into the personal computer as image data; a facsimile modem 18 for sending and receiving image data and text data to and from an external device; a printer 16 for printing out results of various processing; a display unit 15 such as a CRT serving as a man-machine interface; a keyboard 19 operated by a user to make inputs; and a mouse 20 serving as a pointing device. The image data representing the original image to be processed may be loaded into the personal computer 1 by an auxiliary storage medium such as a floppy disk 30.

Figure 2:
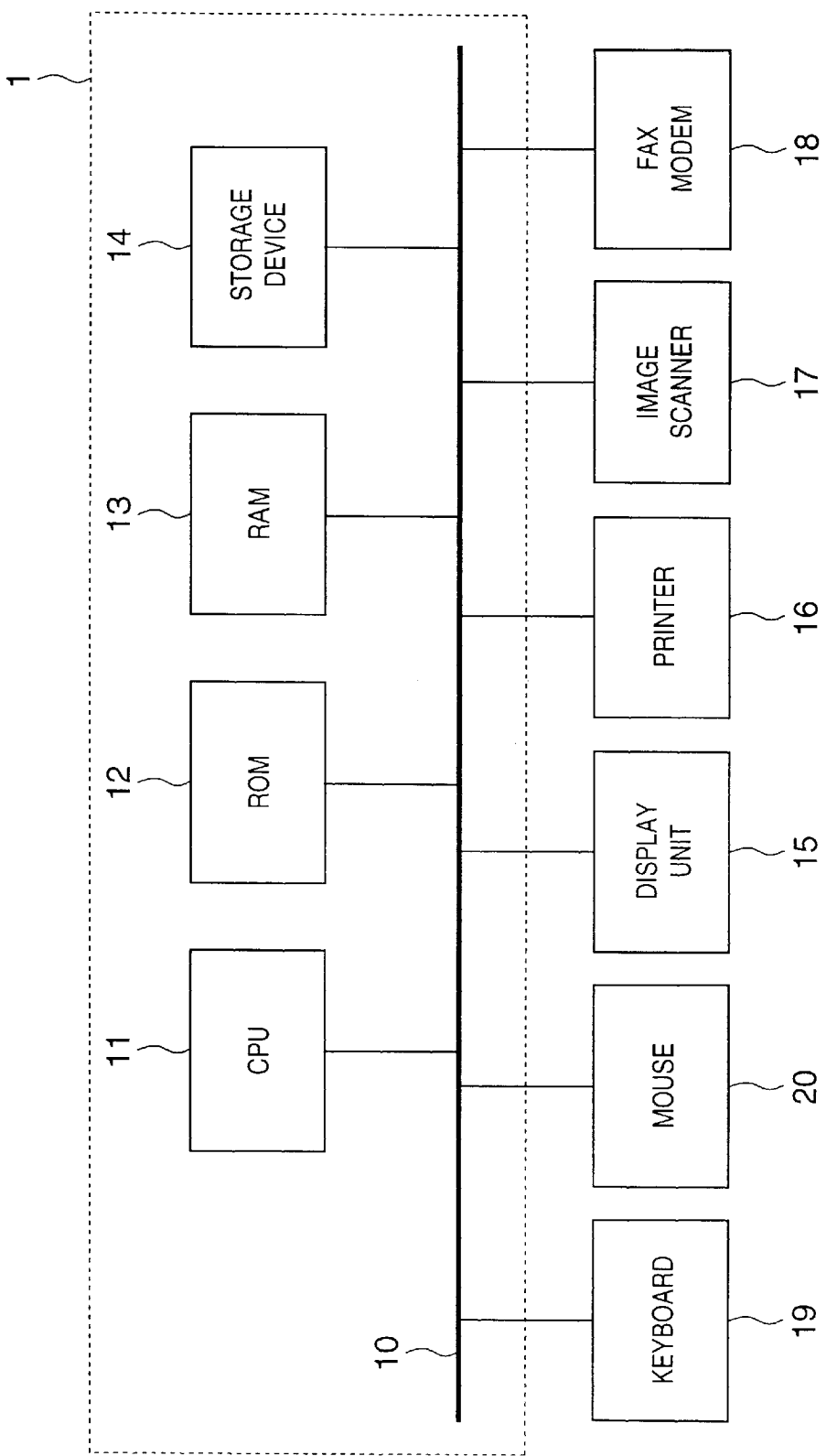
FIG. 2 is a block diagram showing the hardware configuration of the character recognition system according to this embodiment of the present invention.

FIG. 2 is a block diagram showing the hardware configuration of the character recognition system according to this embodiment of the present invention.

The hardware includes a CPU 11 for running the operating system and executing programs such as a program according to the present invention, described later; a ROM 12 storing part of the operating system, such as a BIOS (Basic Input/Output System); a RAM 13 for loading the operating system and application programs and used as a working area for these programs; and a storage device 14 such as a hard disk, floppy disk, MO disk or CD-ROM for storing the operating system and application programs inclusive of the program according to this invention, described later, for being used as a working area when these programs are run, and for storing the results of processing. The components and the above-mentioned display unit 15, printer 16, image scanner 17, facsimile modem 18, keyboard 19 and mouse 20 are connected by a bus 10.

Character recognition processing according to this embodiment will be described with reference to FIG. 3.

Figure 3:
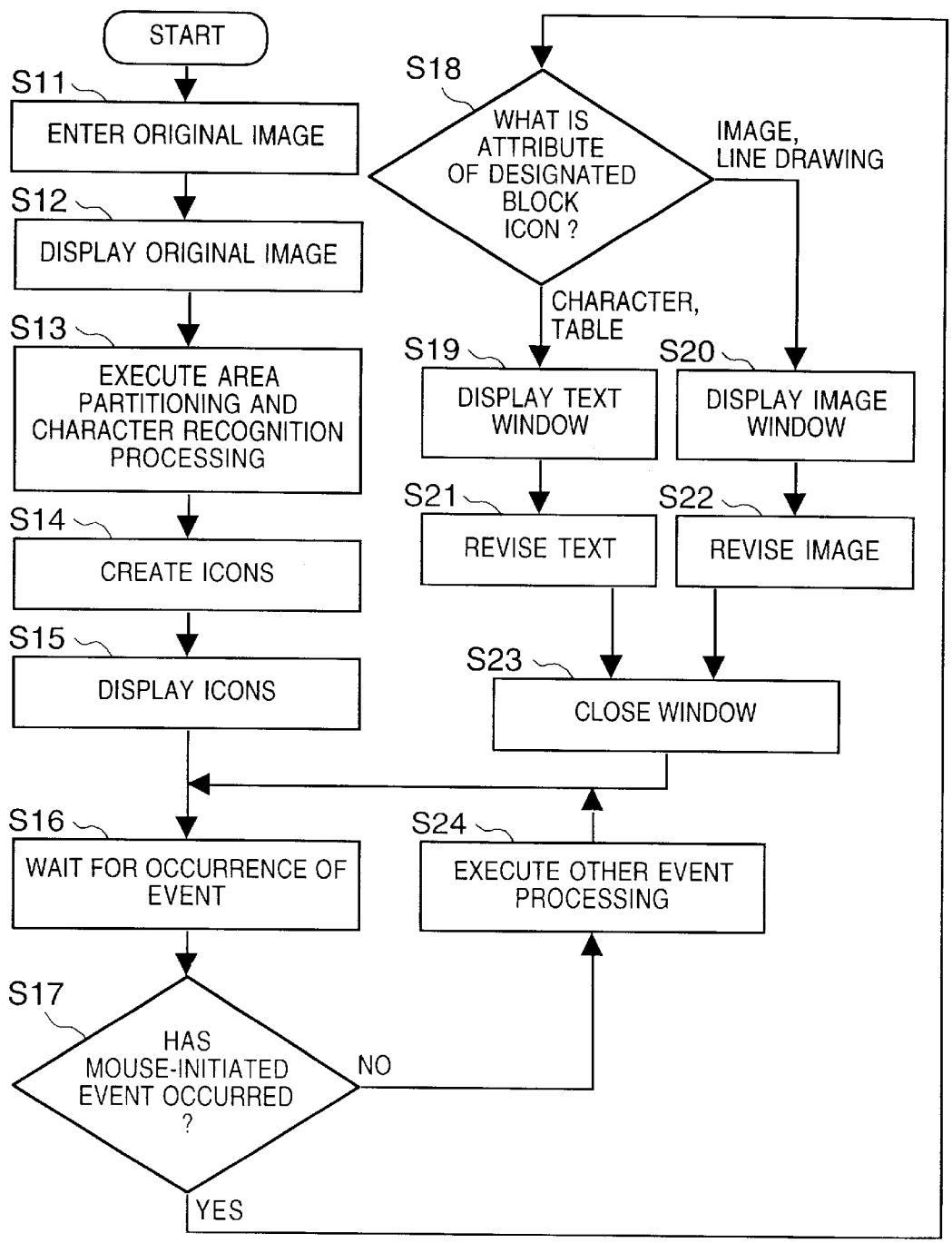
FIG. 3 is a flowchart showing character recognition processing according to this embodiment of the present invention.

FIG. 3 is a flowchart showing character recognition processing according to this embodiment of the present invention. The processing illustrated by this flowchart is executed by the CPU 11.

<Step S11>

An original image containing text is input to the personal computer 1 using the image scanner 17 or facsimile modem 18 at step S11. Inputting the original image to the personal computer 1 entails scanning in the image as a monochrome binary signal at a resolution of 400 dpi (dots per inch) if the image is acquired from the image scanner 17 or at a resolution of about 200 dpi, which is the fine mode, if the image is acquired from the facsimile modem 18.

The processing for scanning in the original image by the image scanner 17 is executed by an interface program in accordance with the TWAIN (Technology Without Any Interested Name) standard.

In a case where the image data is input via the facsimile modem 18, the CPU 11 temporarily converts the faxed document, which has been received under the control of an application program that implements facsimile communication, to a file having a TIFF (Tag Image File Format), by way of example. The data that has been converted to the TIFF file is read in by an application program for executing character recognition processing, whereby the document image is input to the personal computer. (It should be noted that the present application program may itself possess a facsimile reception function and input a text-containing original image directly.)

An ordinary method of executing character recognition processing may be employed, namely extracting feature vectors contained in the image to be processed and performing character recognition by matching the extracted feature vectors with feature vectors registered previously in the form of a dictionary.

The original image data that has been input to the personal computer 1 in this manner is stored in a memory managed as bitmap data by the operating system. The memory that stores the original image data is the RAM 13, for example. However, since the operating system being implemented by the CPU 11 generally has a virtual memory function, the storage device 14 may be used instead of the RAM 13. It will be assumed below that the memory managed by the operating system is the RAM 13 or storage device 14.

<Step S12>

Next, the CPU 11 reads in the original image data from the RAM 13 or storage device 14 at step S12 and displays the read data on the monitor 15.

Figure 4:
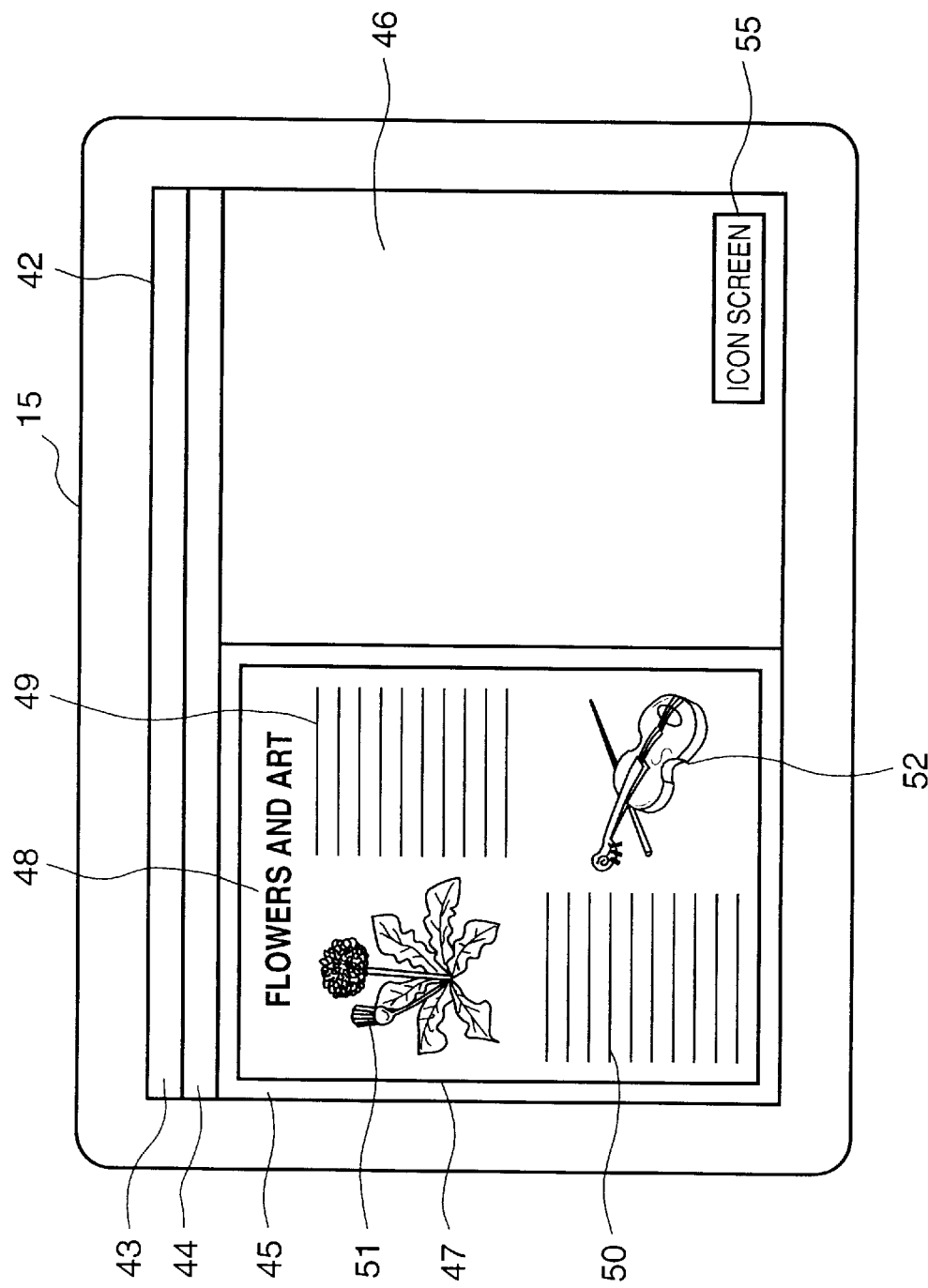
FIG. 4 is a diagram showing an example of an original image displayed on a monitor according to this embodiment of the present invention.

FIG. 4 is a diagram showing an example of an original image displayed on the monitor 15 according to this embodiment of the present invention.

As shown in FIG. 4, the monitor 15 has a display screen 42. Displayed on the display screen 42 is a menu bar 43 of the present application program. The menu bar 43 has a plurality of title headings of pull-down menus (not shown). Examples of these title headings in the menu bar 43 are "FILE", "EDIT", "VIEW", "IMAGE", "RECOGNITION", "OPTION", "TOOLS", "WINDOW" and "HELP", etc. A tool bar 44 is provided with tool buttons for functions that are frequently used. Each button is displayed in the form of a pattern that makes it easy to understand the function that will be performed by clicking on the pattern. Also displayed on the screen is a window 45 for displaying the original image.

Numeral 47 denotes an example of an original image, which contains text, displayed in the window 45. Specifically, the image 47 contains document title text 48, textual portions 49, 50, which show the text of the main body of the document, and pictures 51, 52.

The screen 42 further displays a window 46 for displaying the results of character recognition processing applied to the original image data. A button 55 causes the display to change over to an icon screen (FIG. 10), described later, in response operation of the mouse 20.

<Step S13>

Next, the text-containing original image being displayed in the original-image display window 45 is divided up into areas by the CPU 11 at step S13. The areas thus obtained are enclosed by borders, and the attributes of title text, main text and picture are assigned to the areas. For example, in the example of the original image shown in FIG. 4, the image is partitioned into areas (blocks) 48, 49, 50, 51, 52. The method employed for this area partitioning processing is currently well known and need not be described in detail. By way of example, it is possible to employ the technique described in the specification of Japanese Patent Application Laid-Open No. H6-68301 entitled "Character Recognition Method and Apparatus" (U.S. Pat. No. 5,680,479). In brief, this method involves tracing the contour of connected elements in pixel data that form a binary image, successively forming rectangles enclosing the contours obtained by tracing, and forming blocks by selectively connecting rectangles in horizontal and vertical directions based upon the sizes of the rectangles formed and the proximity relationship with regard to other rectangles. The type of block, namely whether a block is a picture or text, is judged based upon the percentage of the block occupied by black pixels.

Step S13 further calls for the CPU 11 to apply character recognition processing to text areas (49, 50) and store the results of character recognition (block information) in the memory managed by the operating system. The block information will be described with reference to FIGS. 7 to 9.

Figure 7:
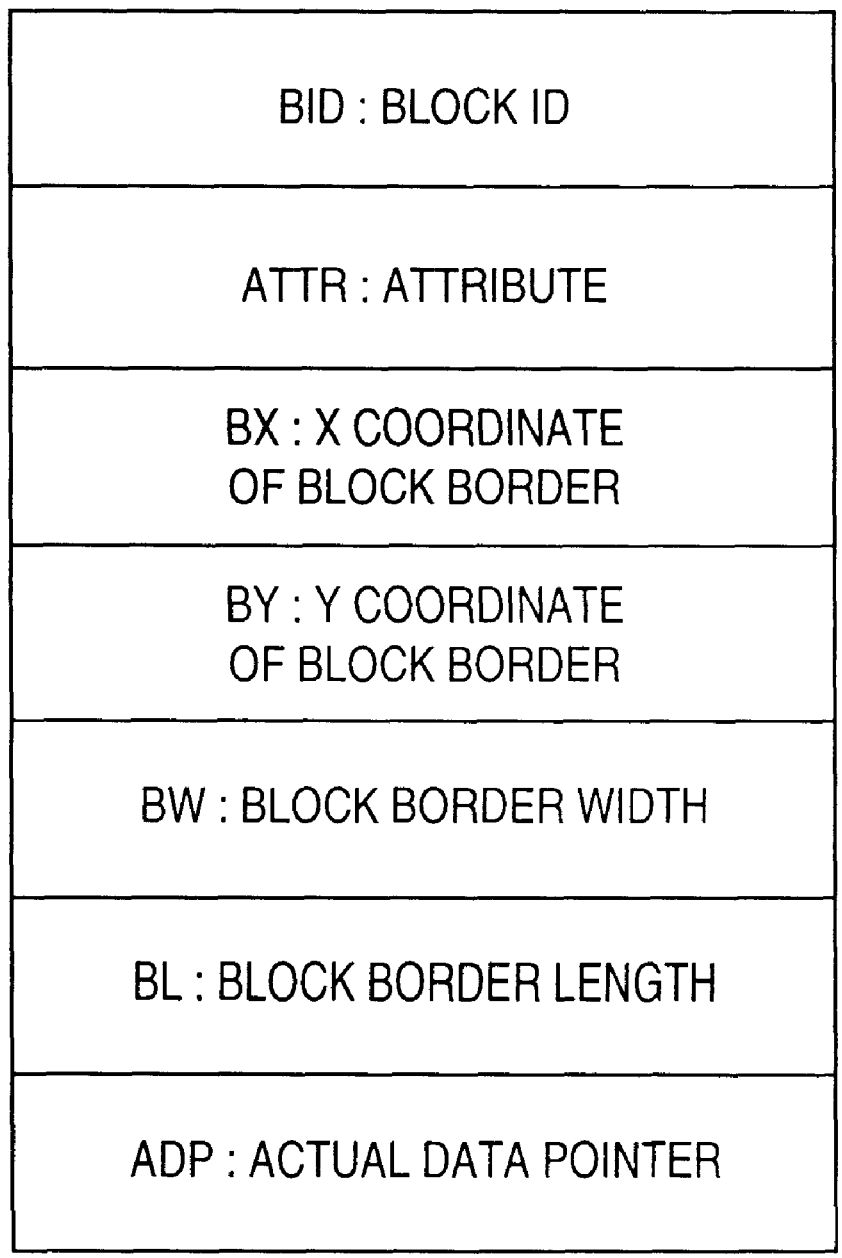
FIG. 7 is a diagram showing the structure of block information according to this embodiment of the present invention.
Figure 8:
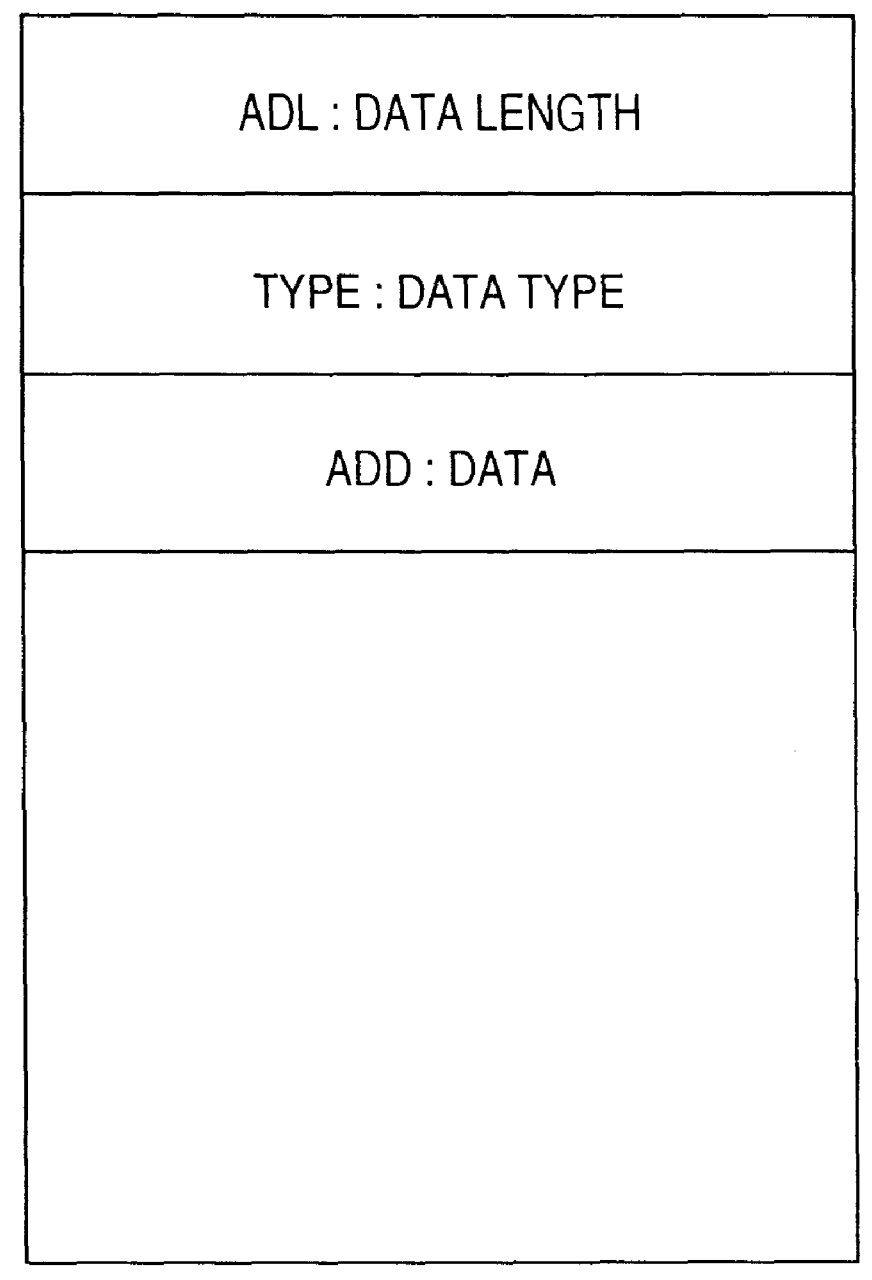
Figure 9:
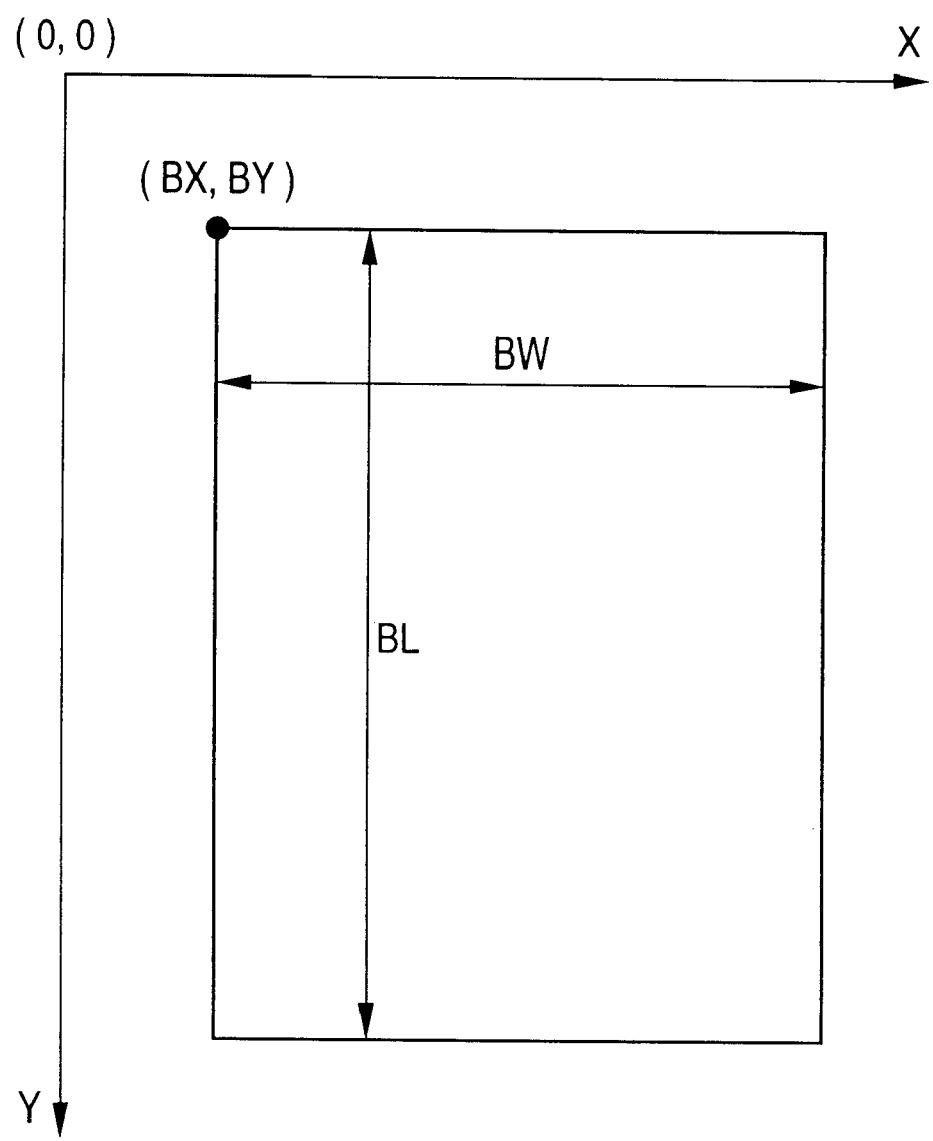
FIG. 9 is a diagram useful in describing variables of block information according to this embodiment of the present invention.

FIG. 7 is a diagram showing the structure of block information according to this embodiment of the present invention, FIG. 8 is a diagram showing the structure of actual data according to this embodiment, and FIG. 9 is a diagram useful in describing variables of the block information according to this embodiment.

In FIG. 7, BID (block ID) is an identification number appended to a block that has been sensed in area partitioning processing. The BIDs are assigned in any desired order without being duplicated. ATTR represents a code for distinguishing attributes. For example, it is assumed that a code "10" represents title text, "11" main text and "20" a picture.

Next, items of data BX (X coordinate value of a block border), BY (Y coordinate value of the block border), BW (width of the block border) and BL (length of the block border) are related as shown in FIG. 9. More specifically, (BX, BY) are the coordinates of the upper left-hand corner of the block border in an X–Y coordinate system in which the upper leftmost corner of a text-containing original image is taken as the origin (0,0), and BW, BL represent width and length of the block in the X and Y directions, respectively.

An actual data pointer (ADP) is the starting address of actual data stored in the memory managed by the operating system. In the case of a picture, the actual data is a bitmap image obtained by extracting the image of the portion corresponding to the picture from the text-containing original image. In case of text, the actual data is text data obtained as the result of character recognition. The data structure of actual data is illustrated in FIG. 8.

In the structure of actual data shown in FIG. 8, ADL represents the data length and TYPE represent the data type. For example, if TYPE is "1", this signifies a bitmap image; if TYPE is "2", this means text data. Further, ADD represents the stored code of the bitmap image data or text data.

Figure 5:
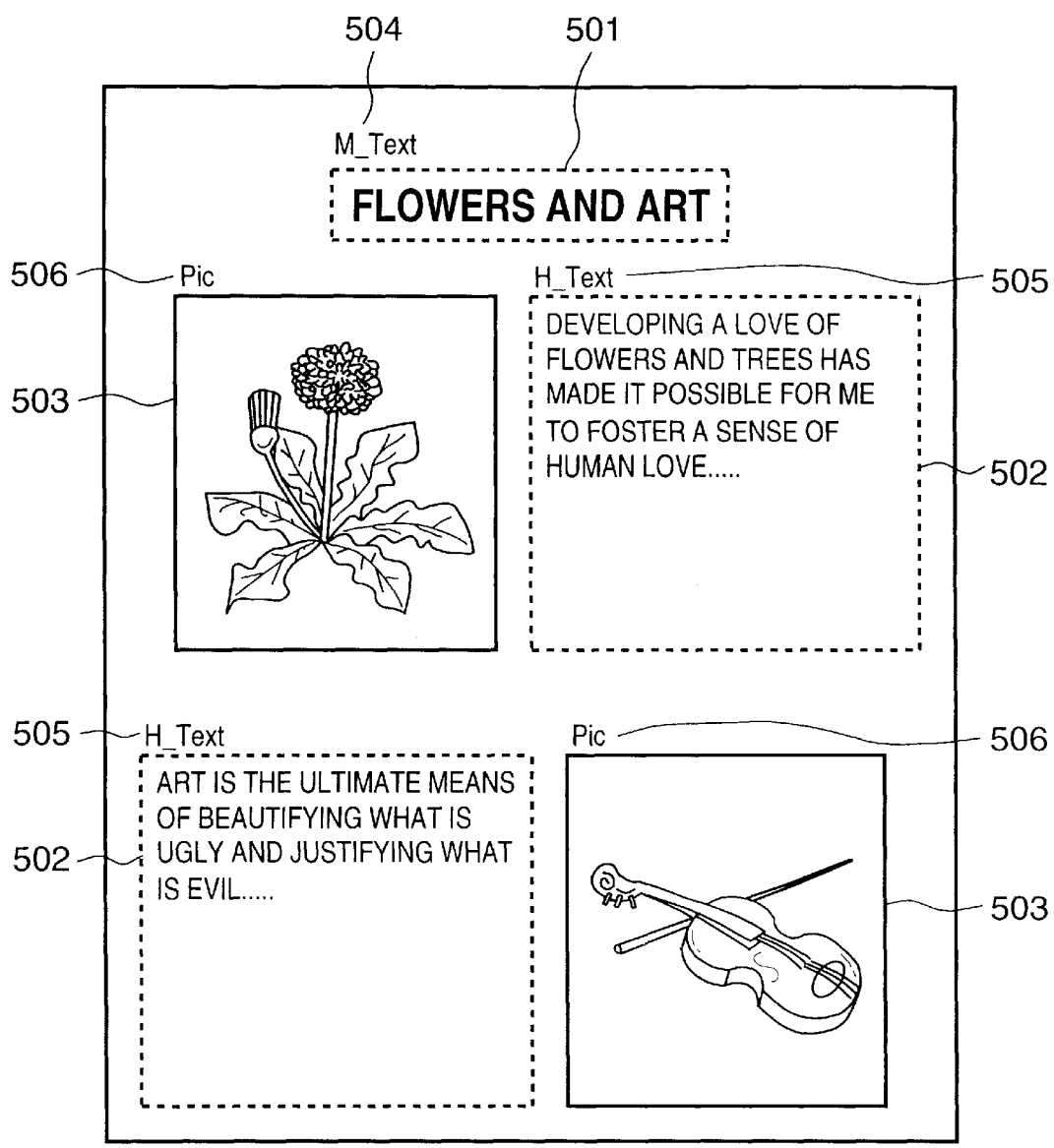
FIG. 5 is a diagram showing an example in which results of area partitioning processing are displayed on a monitor according to this embodiment of the present invention.

FIG. 5 is a diagram showing an example in which results of area partitioning processing are displayed on the monitor according to this embodiment of the present invention. Numerals 501, 502 and 503 in FIG. 5 denote block borders assigned to areas that have been sensed (i.e., partitioned from the original image). M_Text of an identifier 504 is attribute information representing title text, H_Text of an identifier 505 is attribute information representing main text, and Pic of an identifier 506 is attribute information representing a picture. These identifiers are displayed at the upper left of the corresponding blocks.

<Step S14>

Next, step S14 calls for the CPU 11 to create a document icon corresponding to the screen shown in FIG. 5, for which area partitioning and character recognition have been completed, as well as block icons within the document icon. In the creation of the icons, the CPU 11 decides the BIDs (block IDs) shown in FIG. 7 for the purpose of identifying the respective block icons.

<Step S15>

Figure 6:
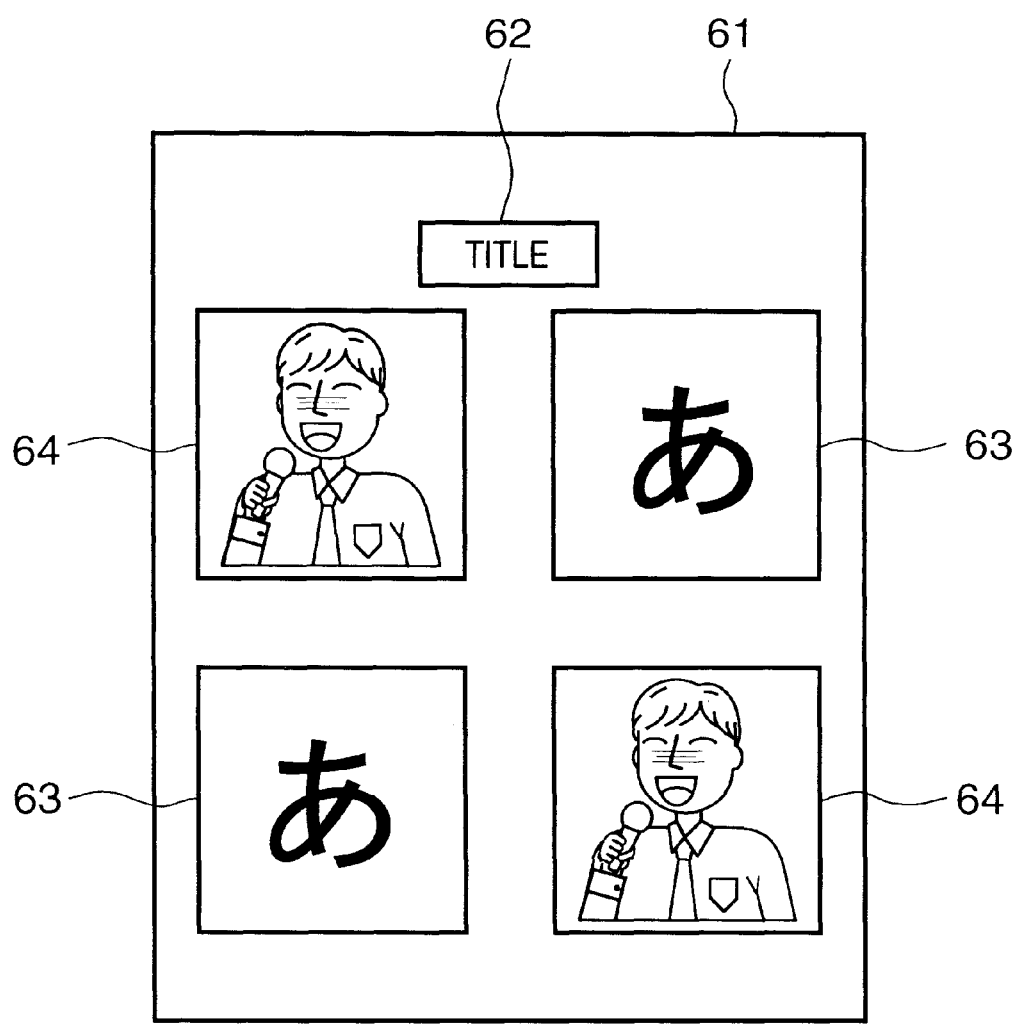
FIG. 6 is a diagram showing an example of a display of icons on a screen according to this embodiment of the present invention.

Next, at step S15, the CPU 11 causes document icons 61 of the kind exemplified in FIG. 6 to be displayed in at-a-glance fashion on the display unit 15, each document icon corresponding to an individual page. FIG. 6 is a diagram showing an example of the display of the iconized screen according to this embodiment of the present invention. Numeral 61 denotes the border of the document icon. This border corresponds to the entire screen display of FIG. 5. Numeral 62 denotes the block icon of the title text enclosed by block border 501 in FIG. 5, 63 the block icons of the main textual portions enclosed by block borders 502, and 64 the block icons of pictures enclosed by the block borders 503.

The block icons depicted in FIG. 6 have been registered in the storage device 14 in the form of predetermined designs and in the bitmap image format as data accompanying the present application program. Accordingly, since the attributes of the block borders shown in FIG. 5 have been recognized by the CPU 11 at step S13, the iconized screen of FIG. 6 can be displayed on the display unit 15 by selecting the block icons at step S14 in dependence upon the attribute information.

Figure 10:
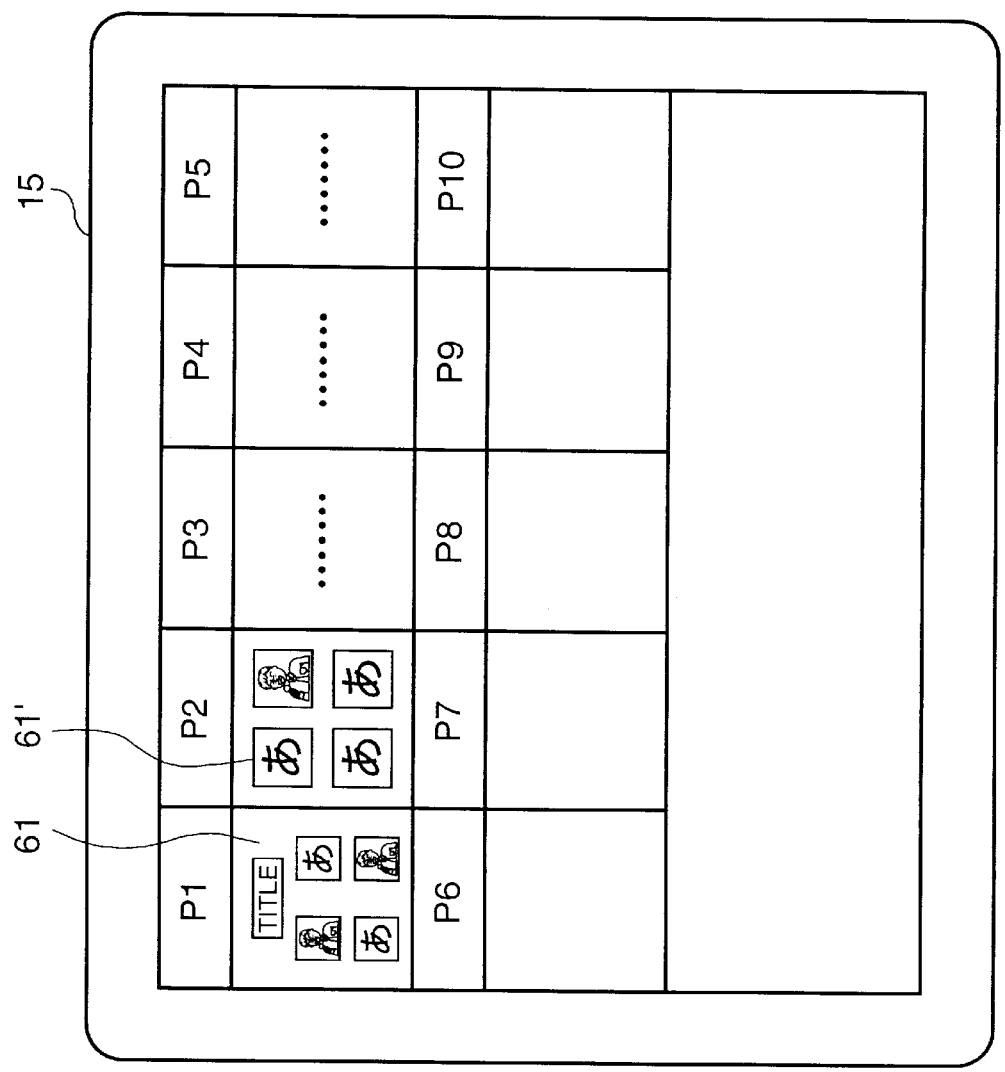
FIG. 10 is a diagram showing an example of the display of an icon screen according to this embodiment of the present invention.

FIG. 10 is a diagram showing an example of the display of the icon screen according to this embodiment of the present invention. As shown in FIG. 10, iconized screens are displayed on the icon screen in page order in accordance with the order in which they were processed by the present application software. In FIG. 10, an example is shown in which the first page of a plurality of iconized pages is the document icon 61 of FIG. 6.

It should be noted that the icon screen is not limited to the matrix-like at-a-glance screen of the kind shown in FIG. 10. For example, it is possible to present a display in which the page numbers appear within the respective document icons.

The size of the document icon 61 when it is displayed is made 50×70 dots, by way of example. In a case where the overall size of the document icon 61 is on this order or even smaller, it may not be possible to make the design of the block icons 64 as shown in the example of display shown in FIG. 6. In such case, it goes without saying that a simpler design may be adopted so long as the attribute of the block can be distinguished. For example, the color of block icons may be made different colors for the text and picture blocks.

<Step S16>

Next, at step S16, the CPU 11 establishes a state in which the present application waits for the occurrence of various events. Examples of such events are designation of block icons 62, 63 using the mouse 20 (e.g., by double-clicking on the icon using a left-hand button on the mouse), a designation to newly enter an original image containing text, and termination of the present application program, etc.

<Steps S17, S24>

Upon sensing the occurrence of some event at step S16, the CPU 11 determines at step S17 whether the event is the result of operation of the mouse 20. When the CPU 11 determines that the event is not the result of mouse operation ("NO" at step S17), the CPU 11 executes prescribed processing (step S24) that conforms to the event sensed at step S16. For example, in a case where the event that occurred is a designation to enter a new original image, the CPU 11 executes the processing of steps S11 to S15 again and again waits for the occurrence of an event at step S16. When the sensed event is one resulting from operation of the mouse 20 ("YES" at step S17), on the other hand, control proceeds to step S18.

<Step S18>

Next, at step S18, the CPU 11 retrieves the attribute of a block icon designated by the mouse 20. If the result of retrieval is that the attribute of this block icon is a text attribute (the title text block or the main text block), control proceeds to step S19. If the attribute of this block icon is the image (picture) attribute, on the other hand, then control proceeds to step S20.

<Step S19>

Next, on the basis of the block ID regarding the block icon designated by the mouse 20, the CPU 11 refers to the block information (FIG. 7) pertaining to this block icon, extracts the text data from the ADD area of the actual data (FIG. 8) that has been stored in the address area indicated by the ADP (actual data pointer) contained in this block information, and displays this text data as a text window on the display unit 15 at step S19.

<Step S21>

The text window displayed at step S19 at least has the configuration of an ordinary editor and makes it possible to revise, delete and replace text currently being displayed in the window.

Each character extracted from the ADD area and displayed has attendant character data indicative of one or more character candidates of second-ranked candidates onward obtained by the character recognition processing of step S13. The user designates the desired character within the text window using the mouse 20, as by clicking on the character using a right-hand button on the mouse. In response, the CPU 11 causes display of a smaller subordinate window that displays this character's candidates from the second-ranked candidates onward. The user can then designate the character represented by the desired candidate using the mouse 20, hereby the designated character is capable of being substituted for the character of the first-ranked candidate. It should be noted that the character of the first-ranked candidate is the character initially displayed in the text window.

<Step S20>

Next, on the basis of the block ID regarding the block icon designated by the mouse 20, the CPU 11 refers to the block information (FIG. 7) pertaining to this block icon, extracts the bitmap image from the ADD area of the actual data (FIG. 8) that has been stored in the address area indicated by the ADP (actual data pointer) contained in this block information, and displays this bitmap image as an image window on the display unit 15 at step S20.

<Step S22>

The image window displayed at step S20 is a window whose displayed content is the same as the pictures 51 and 52 which appeared when the original image was displayed (FIG. 4) at step S12. By tracing a displayed picture using the mouse 20, the user can erase the part of the image traced.

<Step S23>

If the user finishes the revision of the text or image and performs a prescribed operation using the mouse 20 or the like, the CPU 11 at step S23 closes the text window or image window currently being displayed. Control then returns to step S16.

Thus, in accordance with this embodiment as described above, image data representing an original image that has undergone character recognition is converted, when necessary, to a document icon having a size of 50×70 dots displayed on the display unit 15. Alternatively, text and pictures in the document can be revised easily on the display unit 15 while the entire image resulting from character recognition is being displayed. In a case where the document constituting the original image has a plurality of pages, repeating the above-described processing makes it possible to display a plurality of document icons of the kind shown in FIG. 6 on the icon display of FIG. 10, where each document icon corresponds to one individual page. As a result, while observing the overall relationship of a plurality of pages, the user can edit text and pictures contained in the document and it is easier for the user to copy and paste data from one page to another.

Note, in the above described embodiment, the document icon corresponding to the screen are created by using the bitmap image, which are prepared in the storage device 14, having predetermined designs at step S14 in FIG. 3. However, a document icon may be created by performing prescribed image processing instead of selecting the prepared bitmap image. For example, a document icon may be created by performing image-reduction for each data block at step S14. More particularly, a reduced image may be created by selecting every 5 lines, to length and width directions of the data block, among the data block or using a prescribed image-reduction function provided with an operation system like Windows. Preferably, when the image-reduction processing are performed, a use may select desired rate.

<Other Embodiment>

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the embodiment described above, it is possible to realize an image processing apparatus and method featuring easier manipulation and editing of input images.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    area partitioning means for splitting an input image into a plurality of block areas corresponding to a plurality of block images and generating a data block with regard to each block image, each data block respectively including a prescribed structure that includes attribute data conforming to a type of a corresponding block image; and
    symbol display means for assigning, to each of the plurality of block images depending upon the attribute data, any symbol from among a plurality of predetermined symbols, and for displaying the assigned symbols in a displayed image,
    wherein said symbol display means displays, in the displayed image, an input-image symbol that includes the symbols assigned to respective ones of the plurality of block images and that represents an overall composition of the input image.

2. The apparatus according to claim 1, further comprising reproducing means for, when any symbol among the symbols displayed by said symbol display means has been selected, reproducing the block image that corresponds to the selected symbol based upon data included in the data block that corresponds to the block image.

3. The apparatus according to claim 1, wherein said symbol display means displays the input-image symbol for each individual page of the input image in the displayed image.

4. The apparatus according to claim 1, wherein said symbol display means lays out the symbols, which have been assigned to respective ones of the plurality of block images, in the input-image symbol in conformity with placement of the plurality of block images in the input image.

5. The apparatus according to claim 1, wherein the plurality of predetermined symbols differ from one another in terms of color and/or design.

6. An image processing apparatus comprising:
    area partitioning means for splitting an input image into a plurality of block areas corresponding to a plurality of block images and generating a data block with regard to each block image, each data block respectively including a prescribed structure that includes of attribute data conforming to a type of a corresponding block image; and
    symbol display means for assigning, to each of the plurality of block images, a symbol created by prescribed image processing based on each block image, and displaying the assigned symbols in a displayed image,
    wherein said symbol display means displays, in the displayed image, an input-image symbol that includes the symbols assigned to respective ones of the plurality of block images and that represents an overall composition of the input image.

7. The apparatus according to claim 6, further comprising reproducing means for, when any symbol among the symbols displayed by said symbol display means has been selected, reproducing the block image that corresponds to the selected symbol based upon data included in the data block that corresponds to the block image.

8. The apparatus according to claim 6, wherein said symbol display means displays the input-image symbol for each individual page of the input image in the displayed image.

9. The apparatus according to claim 6, wherein said symbol display means lays out the symbols, which have been assigned to respective ones of the plurality of block images, in the input-image symbol in conformity with placement of the plurality of block images in the input image.

10. An image processing method comprising:
    an area partitioning step of splitting an input image into a plurality of block areas corresponding to a plurality of block images and generating a data block with regard to each block image, each data block respectively including a prescribed structure that includes attribute data conforming to a type of a corresponding block image; and
    a symbol display step of assigning, to each of the plurality of block images depending upon the attribute data, any symbol from among a plurality of predetermined symbols, and displaying the assigned symbols in a displayed image,
    wherein said symbol display step includes displaying in the displayed image an input-image symbol that includes the symbols assigned to respective ones of the plurality of block images and that represents an overall composition of the input image.

11. The method according to claim 10, further comprising a reproducing step of, when any symbol among the symbols displayed in said symbol display step has been selected, reproducing the block image that corresponds to the selected symbol based upon data included in the data block that corresponds to the block image.

12. The method according to claim 10, wherein said symbol display step displays the input-image symbol for each individual page of the input image in the displayed image.

13. The method according to claim 10, wherein said symbol display step lays out the symbols, which have been assigned to respective ones of the plurality of block images, in the input-image symbol in conformity with placement of the plurality of block images in the input image.

14. The method according to claim 10, wherein the plurality of predetermined symbols differ from one another in terms of color and/or design.

15. An image processing method comprising:

an area partitioning step of splitting an input image into a plurality of block areas corresponding to a plurality of block images and generating a data block with regard to each block image, each data block respectively including a prescribed structure that includes attribute data conforming to a type of a corresponding block image; and a symbol display step of assigning, to each of the plurality of block images, a symbol created by prescribed image processing based on each block image, and displaying the assigned symbols in a displayed image, wherein said symbol display step includes displaying in the displayed image an input-image symbol that includes the symbols assigned to respective ones of the plurality of block images and that represents an overall composition of the input image.

16. The method according to claim 15, further comprising reproducing step of, when any symbol among the symbols displayed in said symbol display step has been selected, reproducing the block image that corresponds to the selected symbol based upon data included in the data block that corresponds to the block image.

17. The method according to claim 15, wherein said symbol display step displays the input-image symbol for each individual page of the input image in the displayed image.

18. The method according to claim 15, wherein said symbol display step lays out the symbols, which have been assigned to respective ones of the plurality of block images, in the input-image symbol in conformity with placement of the plurality of block images in the input image.

19. A computer readable storage medium for causing a computer to operate as the image processing apparatus described in claim 1.

20. A computer readable storage medium for causing a computer to operate as the image processing apparatus described in claim 6.

21. A computer readable storage medium for causing the image processing method described in claim 10 to be implemented in a computer.

22. A computer readable storage medium for causing the image processing method described in claim 15 to be implemented in a computer.

23. The apparatus according to claim 1, wherein said symbol display means displays, when the input image represents a plurality of pages, the input-image symbol for each of the plurality of pages in a same displayed image in accordance with an order of the plurality of pages.

24. The apparatus according to claim 6, wherein said symbol display means displays, when the input image represents a plurality of pages, the input-image symbol for each of the plurality of pages in a same displayed image in accordance with an order of the plurality of pages.

25. The method according to claim 10, wherein, when the input image represents a plurality of pages, the input-image symbol for each of the plurality of pages is displayed, in said symbol display step, in a same displayed image in accordance with an order of the plurality of pages.

26. The method according to claim 15, wherein, when the input image represents a plurality of pages, the input-image symbol for each of the plurality of pages is displayed, in said symbol display step, in a same displayed image in accordance with an order of the plurality of pages.

* * * * *

UNITED STATES PATENT AND TRADEMARK OFFICE
CERTIFICATE OF CORRECTION

PATENT NO. : 6,275,609 B1  
DATED : August 14, 2001  
INVENTOR(S) : Masami Kugai Page 1 of 1

It is certified that error appears in the above-identified patent and that said Letters Patent is hereby corrected as shown below:

<u>Title page,</u>  
*Assistant Examiner*,  
"Seyed. Azarian" should read -- Seyed Azarian --.

<u>Column 2,</u>  
Line 65, "symbol" should read -- symbols --.

<u>Column 3,</u>  
Line 10, "are" should read -- is --.

<u>Column 6,</u>  
Line 22, "the" should read -- a --.

<u>Column 11,</u>  
Line 20, "differ" should read -- differs --.

Signed and Sealed this

Fifth Day of March, 2002

*Attest:*

*Attesting Officer*

JAMES E. ROGAN  
*Director of the United States Patent and Trademark Office*